(12) United States Patent
Park et al.

(10) Patent No.: US 9,715,154 B2
(45) Date of Patent: Jul. 25, 2017

(54) LIQUID CRYSTAL DISPLAY

(71) Applicant: Samsung Display Co., Ltd., Yongin-si (KR)

(72) Inventors: Eun-Kil Park, Cheonan-si (KR); Swae-Hyun Kim, Asan-si (KR); Chang Il Tae, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/954,381

(22) Filed: Nov. 30, 2015

(65) Prior Publication Data

US 2016/0216585 A1 Jul. 28, 2016

(30) Foreign Application Priority Data

Jan. 22, 2015 (KR) .................. 10-2015-0010708

(51) Int. Cl.

| | |
|---|---|
| *H01L 27/12* | (2006.01) |
| *G02F 1/1362* | (2006.01) |
| *G02F 1/1333* | (2006.01) |
| *G02F 1/1335* | (2006.01) |
| *G02F 1/1343* | (2006.01) |
| *G02F 1/1337* | (2006.01) |

(52) U.S. Cl.
CPC .. *G02F 1/136286* (2013.01); *G02F 1/133345* (2013.01); *G02F 1/133514* (2013.01); *G02F 1/133707* (2013.01); *G02F 1/134309* (2013.01); *G02F 1/133788* (2013.01); *G02F 2001/133726* (2013.01); *G02F 2001/136218* (2013.01)

(58) Field of Classification Search
CPC ............... H01L 27/124; H01L 2/12487; H01L 27/1262; H01L 27/12; H01L 27/12487; G02F 1/136286; G02F 1/133345; G02F 1/133514; G02F 1/133707; G02F 1/134309

See application file for complete search history.

(56) References Cited

U.S. PATENT DOCUMENTS

| | | | |
|---|---|---|---|
| 7,830,477 B2 | 11/2010 | Kim | |
| 7,843,519 B2 | 11/2010 | He et al. | |
| 7,864,288 B2 | 1/2011 | Wang et al. | |
| 2006/0109222 A1* | 5/2006 | Lee | G02F 1/13338 345/88 |
| 2008/0296582 A1 | 12/2008 | Zhao et al. | |
| 2012/0147287 A1 | 6/2012 | Fujioka | |

(Continued)

FOREIGN PATENT DOCUMENTS

| | | |
|---|---|---|
| KR | 1020120119299 | 10/2012 |
| KR | 101327795 | 11/2013 |

*Primary Examiner* — Fazli Erdem

(74) *Attorney, Agent, or Firm* — H.C. Park & Associates, PLC

(57) ABSTRACT

A liquid crystal display including a first substrate, a gate line disposed on the first substrate, a gate insulating layer disposed on the gate line, a data line disposed on the gate insulating layer, a first passivation layer disposed on the data line, a color filter disposed on the first passivation layer, a second passivation layer disposed on the color filter, and a pixel electrode and a shielding electrode disposed on the passivation layer. The shielding electrode includes a lower layer formed at a same layer as that of the pixel electrode and an upper layer formed on the lower layer by using an opaque metal layer.

6 Claims, 20 Drawing Sheets

(56) References Cited

U.S. PATENT DOCUMENTS

2013/0093658 A1* 4/2013 Park .................... G02F 1/13452
          345/92
2016/0195789 A1* 7/2016 Park .................. G02F 1/133514
          349/43

* cited by examiner

LIQUID CRYSTAL DISPLAY

CROSS-REFERENCE TO RELATED APPLICATION

This application claims priority from and the benefit of Korean Patent Application No. 10-2015-0010708, filed on Jan. 22, 2015, which is hereby incorporated by reference for all purposes as if fully set forth herein.

BACKGROUND

Field

Exemplary embodiments relate to a liquid crystal display.

Discussion of the Background

A liquid crystal display, which is one of the most common types of flat panel displays currently in use, includes two sheets of display panels with field generating electrodes such as a pixel electrode, a common electrode, and the like, and a liquid crystal layer interposed therebetween. In the liquid crystal layer, voltages are applied to the field generating electrodes to generate an electric field in the liquid crystal layer. The alignment of liquid crystal molecules of the liquid crystal layer is determined by the electric field to control the polarization of incident light, thereby displaying images.

Among the liquid crystal displays, a vertically aligned (VA) mode liquid crystal display, in which long axes of the liquid crystal molecules are arranged to be perpendicular to upper and lower display panels while electric fields are not applied, is popular because its contrast ratio is high and it is easy to implement a wide standard viewing angle.

In order to implement a wide viewing angle in such a vertically aligned mode liquid crystal display, a plurality of domains having different alignment directions of the liquid crystal may be formed in one pixel.

When two display panels, in which a pixel electrode and a common electrode are formed, are misaligned from each other, display quality deterioration, such as light leakage, may be generated at adjacent portions of data lines disposed between two adjacent pixels.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display having advantages of being capable of preventing display quality deterioration such as light leakage from being generated at adjacent portions of data lines disposed between two adjacent pixels even when two display panels in which a pixel electrode and a common electrode are formed are misaligned from each other.

Additional aspects will be set forth in the detailed description which follows, and, in part, will be apparent from the disclosure, or may be learned by practice of the inventive concept.

An exemplary embodiment discloses a liquid crystal display including: a first substrate; a gate line disposed on the first substrate; a gate insulating layer disposed on the gate line; a data line disposed on the gate insulating layer; a first passivation layer disposed on the data line; a color filter disposed on the first passivation layer; a second passivation layer disposed on the color filter; and a pixel electrode and a shielding electrode disposed on the passivation layer. The shielding electrode includes a lower layer formed at a same layer as that of the pixel electrode and an upper layer disposed on the lower layer by using an opaque metal layer.

The shielding electrode may be disposed to overlap the data line, and a width of the shielding electrode may be wider than that of the data line.

The color filter may include a first color filter and a second color filter which display different colors, and the first color filter and the second color filter may be disposed to overlap each other at a position overlapping the data line.

The liquid crystal display may further include: a second substrate facing the first substrate; and a common electrode formed on the second substrate, and the shielding electrode may receive a common voltage which is applied to the common electrode.

The pixel electrode may include a first subpixel electrode and a second subpixel electrode which are insulated from each other and respectively receive a first voltage and a second voltage, wherein a difference between the first voltage and the common voltage may be greater than a difference between the second voltage and the common voltage.

A first portion of the first subpixel electrode and a second portion of the second subpixel electrode may be positioned to overlap each other with an insulating layer therebetween.

At least a portion of the first subpixel electrode may be disposed below the insulating layer, and the second subpixel electrode may be disposed on the insulating layer.

The first portion of the first subpixel electrode may include a first subregion positioned below the insulating layer and a second subregion positioned on the insulating layer, and the first subregion and the second subregion may be connected to each other through a contact hole formed at the insulating layer.

The pixel electrode may include a plurality of branch electrodes that extend in a plurality of directions.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
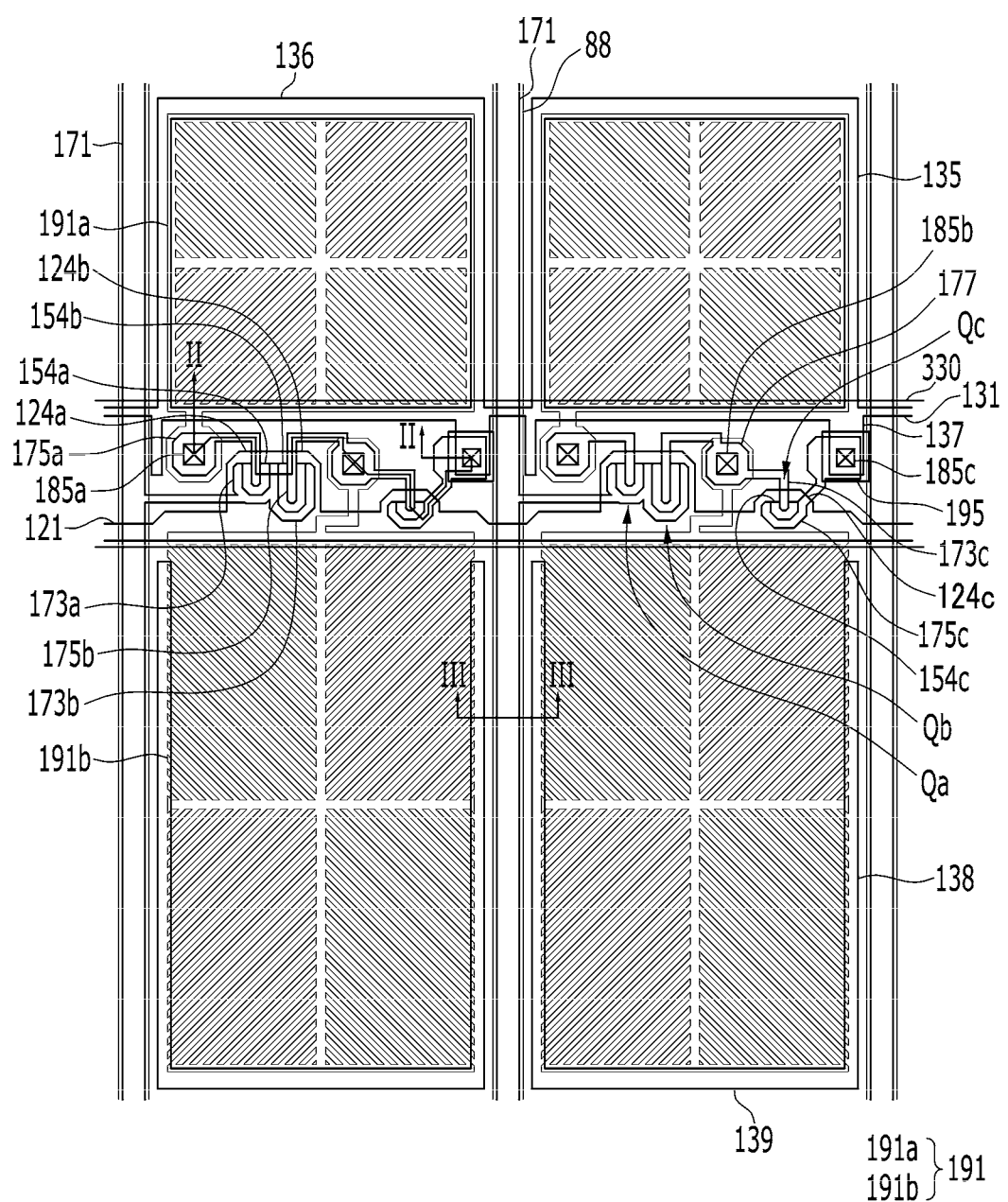
FIG. 1 is a layout view of a liquid crystal display according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a liquid crystal display according to an exemplary embodiment will be described with reference to FIG. 1, FIG. 2, and FIG. 3. FIG. 1 is a layout view of liquid crystal display according to an exemplary embodiment, FIG. 2 is a cross-sectional view of the liquid crystal display shown in FIG. 1 taken along the line II-II, and FIG. 3 is a cross-sectional view of the liquid crystal display shown in FIG. 1 taken along the line III-II.

Figure 2:
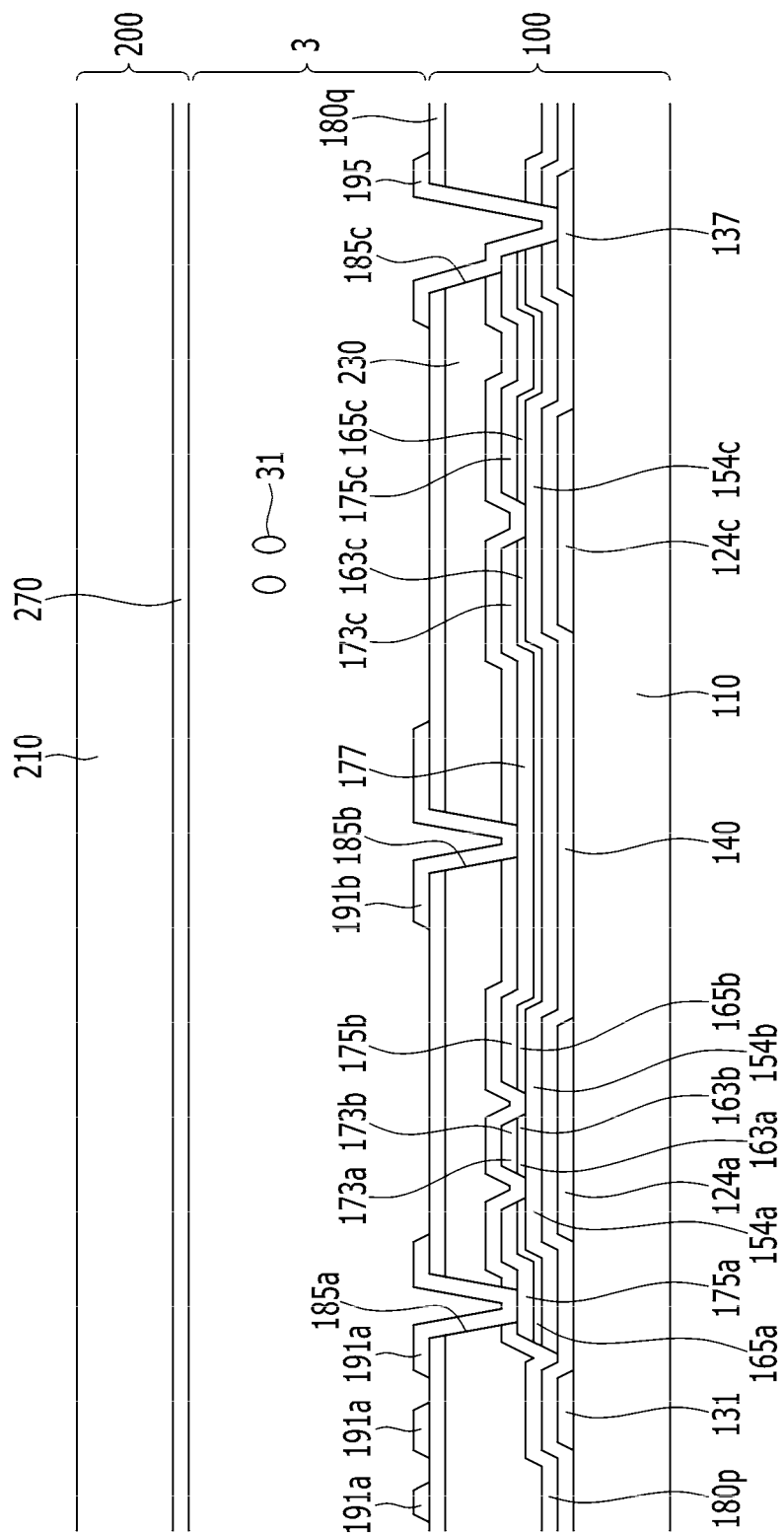
FIG. 2 is a cross-sectional view of the liquid crystal display shown in FIG. 1 taken along the line II-II.
Figure 3:
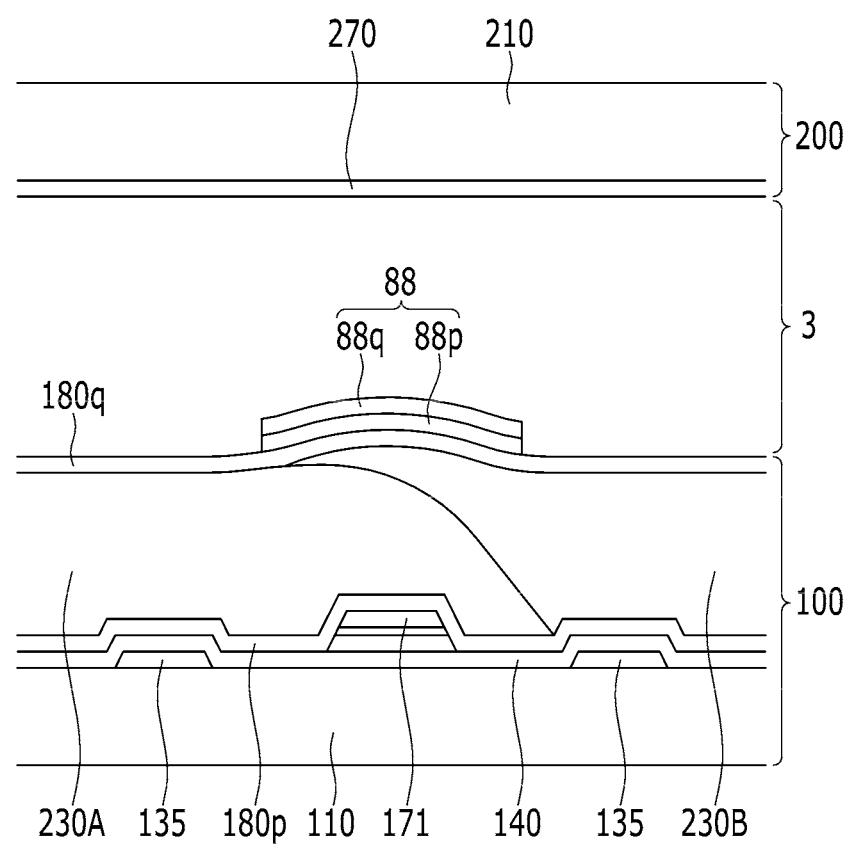
FIG. 3 is a cross-sectional view of the liquid crystal display shown in FIG. 1 taken along the line III-III.

Referring to FIG. 1 to FIG. 3, the liquid crystal display according to an exemplary embodiment includes a first display panel 100 and a second display panel 200 which face each other, a liquid crystal layer 3 interposed between the two display panels 100 and 200, and a pair of polarizers (not illustrated) respectively attached to outer sides of the display panels 100 and 200.

First, the first display panel 100 will be described.

A gate conductor including a gate line 121 and a divided reference voltage line 131 is formed on a first substrate 110 formed of transparent material, such as glass or plastic.

The gate line 121 includes a wide end (not illustrated) for connection with a first gate electrode 124a, a second gate electrode 124b, a third gate electrode 124c, and another layer or an external driving circuit.

The divided reference voltage line 131 includes first storage electrodes 135 and 136, and a reference electrode 137. Second storage electrodes 138 and 139 are disposed to not be connected to the divided reference voltage line 131, but to overlap a second subpixel electrode 191b.

A gate insulating layer 140 is formed on the gate line 121 and the divided reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b, and 154c.

A plurality of data lines 171 including a first source electrode 173a and a second source electrode 173b, and data conductors including a first drain electrode 175a, a second drain electrode 175b, a third source electrode 173c, and a third drain electrode 175c are formed on the ohmic contacts 163a, 165a, 163b, 165b, 163c, and 165c and the gate insulating layer 140.

The data conductors, and the semiconductors and the ohmic contacts positioned under the data conductors, may be simultaneously formed by using one mask.

The data line 171 includes a wide end portion (not illustrated) for connection with another layer or an external driving circuit.

The first gate electrode 124a, the first source electrode 173a, and the first drain electrode 175a constitute the first thin film transistor Qa along with the first semiconductor 154a, and a channel of the thin film transistor is formed on the first semiconductor 154a between the first source electrode 173a and the first drain electrode 175a. Similarly, the second gate electrode 124b, the second source electrode 173b, and the second drain electrode 175b form one second thin film transistor Qb together with the second semiconductor 154b, and a channel thereof is formed on the second semiconductor 154b between the second source electrode 173b and the second drain electrode 175b, while the third gate electrode 124c, the third source electrode 173c, and the third drain electrode 175c form one third thin film transistor Qc together with the third semiconductor 154c, and a channel thereof is formed on the third semiconductor 154c between the third source electrode 173c and the third drain electrode 175c.

The second drain electrode 175b is connected to the third source electrode 173c and includes a wide expansion 177.

A first passivation layer 180p is positioned on the data conductors 171, 173c, 175a, 175b, and 175c and the exposed semiconductor layers 154a, 154b, and 154c. The first passivation layer 180p may include an inorganic insulating layer that is formed of a silicon nitride or a silicon oxide. The first passivation layer 180p may prevent a pigment of a color filter 230 from flowing into the exposed semiconductor layers 154a, 154b, and 154c.

A color filter 230 is formed on the first passivation layer 180p. A second passivation layer 180q is formed on the color filter 230.

The second passivation layer 180q may include an inorganic insulating layer that is formed of a silicon nitride or a silicon oxide. The second passivation layer 180q prevents the color filter 230 from being lifted, and suppresses contamination of the liquid crystal layer 3 due to an organic material such as a solvent having flowed from the color filter 230, thereby preventing an abnormality, such as a residual image, that may occur when a screen is driven.

A first contact hole 185a and a second contact hole 185b are formed in the first and second passivation layers 180p and 180q to expose the first and second drain electrodes 175a and 175b, respectively.

A third contact hole 185c is formed in the first passivation layer 180p, the second passivation layer 180q, and the gate insulating layer 140 to partially expose the reference electrode 137 and the third drain electrode 175c, and the third contact hole 185c is covered with a connecting member 195. The connecting member 195 electrically connects the reference electrode 137 and the third drain electrode 175c that are exposed through the third contact hole 185c.

A plurality of pixel electrodes 191 and a shielding electrode 88 are formed on the second passivation layer 180q. Each pixel electrode 191 includes the first subpixel electrode 191a and the second subpixel electrode 191b which are separated from each other with the gate line 121 interposed therebetween, and are adjacent in a column direction based on the gate line 121. The pixel electrode 191 may be made of a transparent material, such as ITO or IZO. The pixel electrode 191 may be made of a transparent conductive material such as ITO or IZO, or a reflective metal such as aluminum, silver, chromium, or an alloy thereof.

Figure 4:
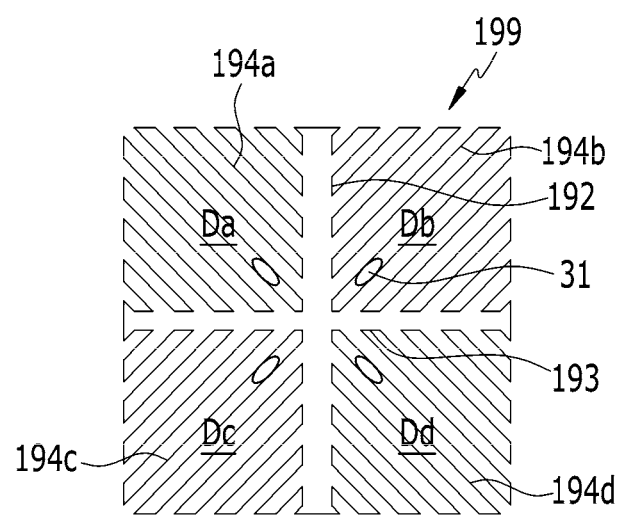
FIG. 4 is a top plan view illustrating a basic area of a pixel electrode of a liquid crystal display according to an exemplary embodiment.

Each of the first subpixel electrode 191a and the second subpixel electrode 191b includes one or more basic electrodes illustrated in FIG. 4, or a modification of the basic electrode.

The first subpixel electrode 191a and the second subpixel electrode 191b are physically and electrically connected to the first drain electrode 175a and the second drain electrode 175b through the first contact hole 185a and the second contact hole 185b, respectively, and receive the data voltage from the first drain electrode 175a and the second drain electrode 175b, respectively. In this case, some of the data voltage applied to the second drain electrode 175b is divided through the third source electrode 173c, so that a size of the voltage applied to the first subpixel electrode 191a may be larger than that of the voltage applied to the second subpixel electrode 191b.

The shielding electrode 88 includes a lower layer 88p formed of the same layer as that of the pixel electrode 191 and an upper layer 88q formed on the lower layer 88p by using an opaque metal layer.

Referring to FIG. 3, a first color filter 230A and a second color filter 230B are disposed to overlap each other on the data line 171. The first color filter 230A and the second color filter 230B display different colors. The shielding electrode 88 is formed on an overlapped portion of the color filters 230A and 230B which are overlapped with each other to overlap the data line 171, and a width of the shielding electrode 88 is wider than that of the data line.

The second display panel 200 will now be described.

A common electrode 270 is formed on a second substrate 210. An upper alignment layer (not shown) is formed on the common electrode 270. The upper alignment layer may serve as a vertical alignment layer.

The liquid crystal layer 3 has negative dielectric anisotropy, and liquid crystal molecules 31 of the liquid crystal layer 3 are aligned such that their long axes are perpendicular to the surfaces of the two display panels 100 and 200 while no electric field is present.

The shielding electrode 88 receives a common voltage having the same magnitude as that of a voltage applied to the common electrode 270 which will be described later.

The first subpixel electrode 191a and the second sub-pixel electrode 191b to which the data voltage is applied generate an electric field together with the common electrode 270 of the second display panel 200 to determine a direction of the liquid crystal molecules of the liquid crystal layer 3 between the two electrodes 191 and 270. The luminance of light passing through the liquid crystal layer 3 is changed according to the thusly determined direction of the liquid crystal molecules.

Hereinafter, a driving method of a liquid crystal display according to an exemplary embodiment will be briefly described.

When a gate-on signal is applied to a gate line 121, the gate-on signal is applied to a first gate electrode 124a, a second gate electrode 124b, and a third gate electrode 124c, thereby turning on a first switching element Qa, a second switching element Qb, and a third switching element Qc. Accordingly, a data voltage applied to a data line 171 is applied to both a first subpixel electrode 191a and a second subpixel electrode 191b through the turned-on first and second switching elements Qa and Qb. In this case, the same voltage is applied to the first subpixel electrode 191a and the second subpixel electrode 191b. However, the voltage applied to the second subpixel electrode 191b is divided by the third switching element Qc that is connected in series to the second switching element Qb. Thus, the voltage applied to the second subpixel electrode 191b is smaller than the voltage applied to the first subpixel electrode 191a.

The liquid crystal display according to an exemplary embodiment may be curved.

As described above, in accordance with the liquid crystal display according to an exemplary embodiment, the shielding electrode 88 is disposed to overlap the data line 171 and to have a width greater than that of the data line 171, and the common voltage is applied to the shielding electrode 88. Accordingly, no electric field is applied to liquid crystal molecules positioned so as to overlap the data line 171. Accordingly, the liquid crystal molecules positioned to overlap the data line 171 maintain an initial alignment state. Specifically, the liquid crystal molecules positioned to overlap the data line 171 maintain the state of being aligned to be substantially perpendicular to the surface of the substrate 110.

Further, the shielding electrode 88 includes a lower layer 88p formed of the same layer as that of the pixel electrode 191 and an upper layer 88q formed on the lower layer 88p by using an opaque metal layer. Accordingly, it is possible to prevent light leakage that may be generated at the position to overlap the data line 171 by the upper layer 88q of the shielding electrode 88.

As such, in accordance with liquid crystal display according to an exemplary embodiment, it is possible to allow the liquid crystal molecules positioned to overlap the data line 171 to maintain the initial alignment state by forming the shielding electrode 88 at the position to overlap the data line 171, to include the lower layer 88p formed of the same layer as that of the pixel electrode 191 and the upper layer 88q formed on the lower layer 88p by using the opaque metal layer, and to prevent the light leakage that may be generated at the position to overlap the data line 171 by the action of the upper layer 88q of the shielding electrode 88 formed of the opaque metal layer. Accordingly, in accordance with the liquid crystal display according to an exemplary embodiment, it is possible to prevent light leakage that may be generated around the data line 171 due to, e.g., misalignment between the two substrates 110 and 210 due to be curved, or steps of layers that are overlapped with the data line 171.

Now, a basic electrode 199 of the lower panel will be described with reference to FIG. 4. FIG. 4 is a top plan view illustrating a basic area of a pixel electrode of a liquid crystal display according to an exemplary embodiment.

As shown in FIG. 4, the basic electrode 199 has an overall quadrangular shape, and includes a cross-shaped stem that consists of a horizontal stem 193 and a vertical stem 192 perpendicular thereto. Further, the basic electrode 199 is divided into a first subregion Da, a second subregion Db, a third subregion Dc, and a fourth subregion Dd by the horizontal stem 193 and the vertical stem 192, and each of the subregions Da-Dd includes a plurality of first minute branches 194a, a plurality of second minute branches 194b, a plurality of third minute branches 194c and a plurality of fourth minute branches 194d.

The first minute branches 194a are positioned to extend obliquely in an upper left direction from the horizontal stem 193 or the vertical stem 192, and the second minute branches 194b are positioned to extend obliquely in an upper right direction from the horizontal stem 193 or the vertical stem 192. Further, the third minute branches 194c are positioned to extend in a lower left direction from the horizontal stem 193 or the vertical stem 192, and the fourth minute branches 194d are positioned to extend obliquely in a lower right direction from the horizontal stem 193 or the vertical stem 192.

The first to fourth minute branches 194a, 194b, 194c, and 194d form an angle of approximately 45° or 135° with respect to the gate lines 121 or the horizontal stem 193. Further, the minute branches 194a, 194b, 194c, and 194d of two adjacent subregions of Da, Db, Dc, and Dd may be orthogonal to each other.

The first subpixel electrode 191a and the second subpixel electrode 191b are physically and electrically connected to the first drain electrode 175a or second drain electrode 175b through the first contact hole 185a and the second contact hole 185b, respectively, and receive the data voltage from the first drain electrode 175a and the second drain electrode 175b, respectively. In this case, edges of the first to fourth minute branches 194a-194d distort the electric field, thereby generating a horizontal component of the electric field which determines an inclination direction of the liquid crystal molecules 31. The horizontal component of the electric field is almost parallel to the edges of the first to fourth minute branches 194a-194d. Accordingly, as shown in FIG. 4, the liquid crystal molecules 31 are inclined in a direction that is parallel with a longitudinal direction of the minute branches 194a-194d. Since one pixel electrode 191 includes the four subregions Da-Dd in which longitudinal directions of the minute branch portions 194a, 194b, 194c, and 194d are respectively different, the liquid crystal molecules 31 are approximately inclined in four directions such that four domains having different alignment directions of the liquid crystal molecules 31 are formed in the liquid crystal layer 3. As such, when the liquid crystal molecules are inclined in various directions, a standard viewing angle of the LCD becomes wider.

Next, a method of initially aligning the liquid crystal molecules 31 to have a pretilt will be described with reference to FIG. 5.

Figure 5:
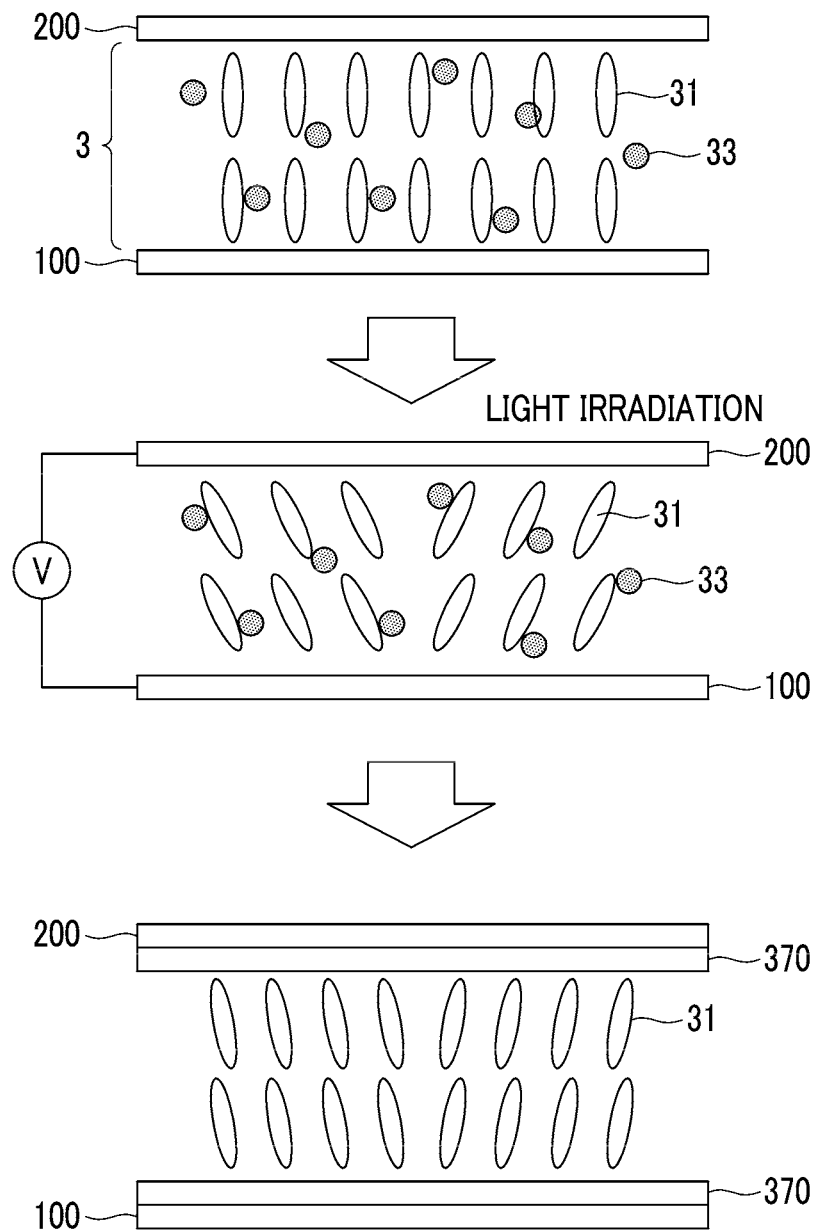
FIG. 5 illustrates a process used for exemplary embodiments for providing a pretilt to liquid crystal molecules by using prepolymers that are polymerized by light such as ultraviolet rays.

FIG. 5 illustrates a process for providing a pretilt to liquid crystal molecules by using prepolymers that are polymerized by light such as ultraviolet rays.

First, a prepolymer 33, for example, a monomer that is polymerized by light, such as ultraviolet rays, is injected along with a liquid crystal material between the two display panels 100 and 200. The prepolymer 33 may be a reactive mesogen that is polymerized by light, such as ultraviolet rays.

Next, an electric field is generated in the liquid crystal layer 3 between the display panels 100 and 200 by applying a data voltage to the first subpixel electrode 191a and the second subpixel electrode 191b and a common voltage to the common electrode 270 of the second display panel 200. Thus, the liquid crystal molecules 31 of the liquid crystal layer 3 are inclined in the direction parallel to longitudinal directions of the minute branches 194a, 194b, 194c, and 194d through two steps as described above in response to the electric field and thus the liquid crystal molecules 31 in one pixel PX are inclined in a total of four directions.

When light such as ultraviolet rays is emitted after an electric field is formed in the liquid crystal layer 3, the prepolymer 33 is polymerized to form a polymer 370, as shown in FIG. 5. The polymer 370 is formed to contact the display panels 100 and 200. The alignment directions of the liquid crystal molecules 31 are determined to have a pretilt corresponding to the aforementioned direction by the polymer 370. Accordingly, the liquid crystal molecules 31 are arranged to have a pretilt corresponding to four different directions even in a state in which a voltage is not applied to the field generating electrodes 191 and 270.

Next, a manufacturing method of a liquid crystal display according to an exemplary embodiment will be described with reference to FIG. 6 through FIG. 12. FIGS. 6 to 12 are stepwise cross-sectional views for a manufacturing process of a liquid crystal display according to an exemplary embodiment, taken along the line III-III of FIG. 1.

Figure 6:
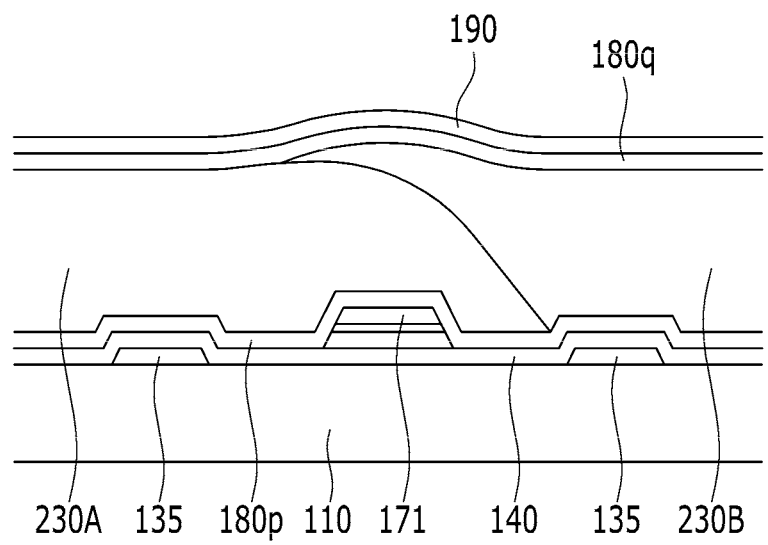
FIGS. 6, 7, 8, 9, 10, 11, and FIG. 12 are stepwise cross-sectional views for a manufacturing process of a liquid crystal display according to an exemplary embodiment, taken along the line III-III of FIG. 1.

As shown in FIG. 6, the data line 171 is formed on the first substrate 110, the first passivation layer 180p is formed on the data line 171, the first color filter 230A and the second color filter 230B displaying different colors are formed on the first passivation layer 180p to overlap each other, and the second passivation layer 180q is formed on the first color filter 230A and the second color filter 230B. A transparent first conductive layer 190 is stacked on the second passivation layer 180q.

Figure 7:
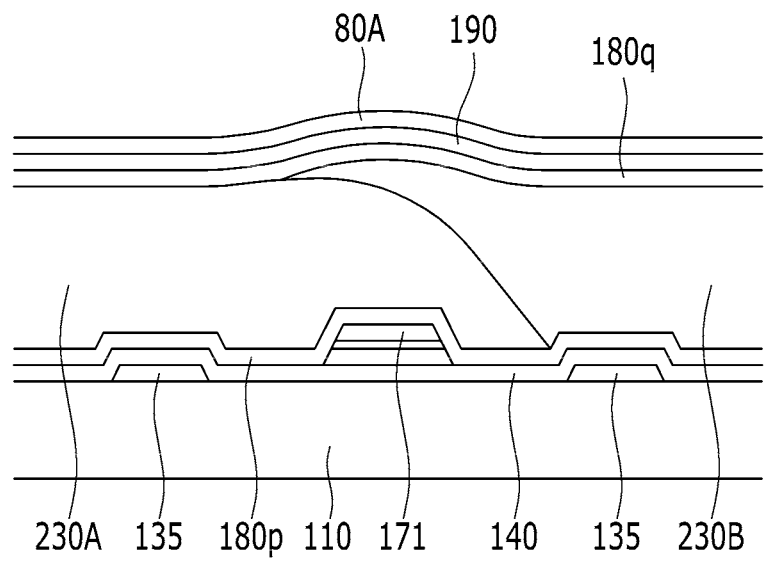

Referring to FIG. 7, an opaque second conductive layer 80A is stacked on the first conductive layer 190.

Figure 8:
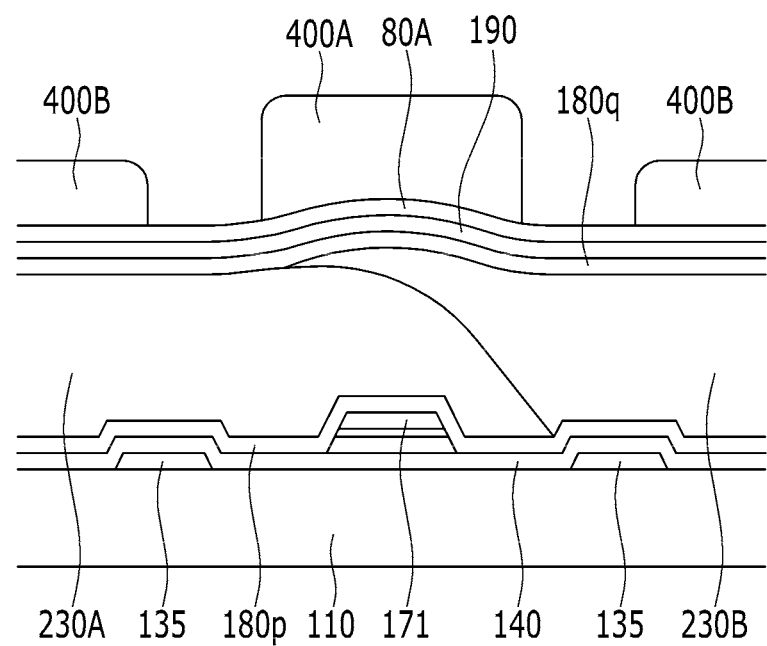

As shown in FIG. 8, a first photosensitive film pattern 400A and a second photosensitive film pattern 400B are formed on the second conductive layer 80A to have different heights. A thickness of the first photosensitive film pattern 400A is greater than that of the second photosensitive film pattern 400B.

Figure 9:
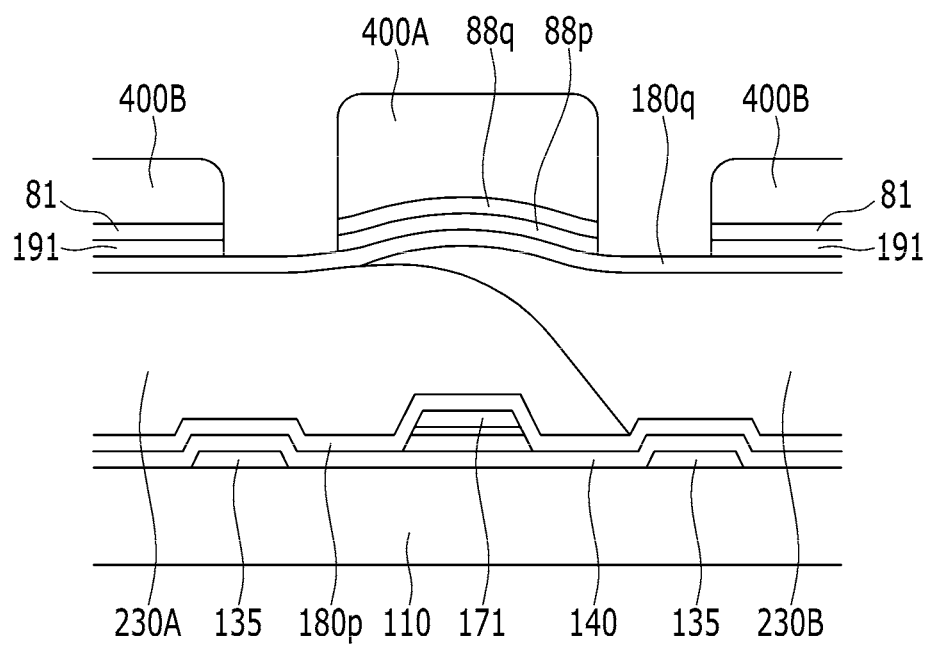

Next, as shown in FIG. 9, the second conductive layer 80A and the first conductive layer 190 are sequentially etched by using the first photosensitive film pattern 400A and the second photosensitive film pattern 400B as etching masks.

The first conductive layer 190 is etched to form the pixel electrode 191 and the lower layer 88p of the shielding electrode 88, and the second conductive layer 80A is etched to form the upper layer 88q of the shielding electrode 88 and an opaque metal layer 81.

Figure 10:
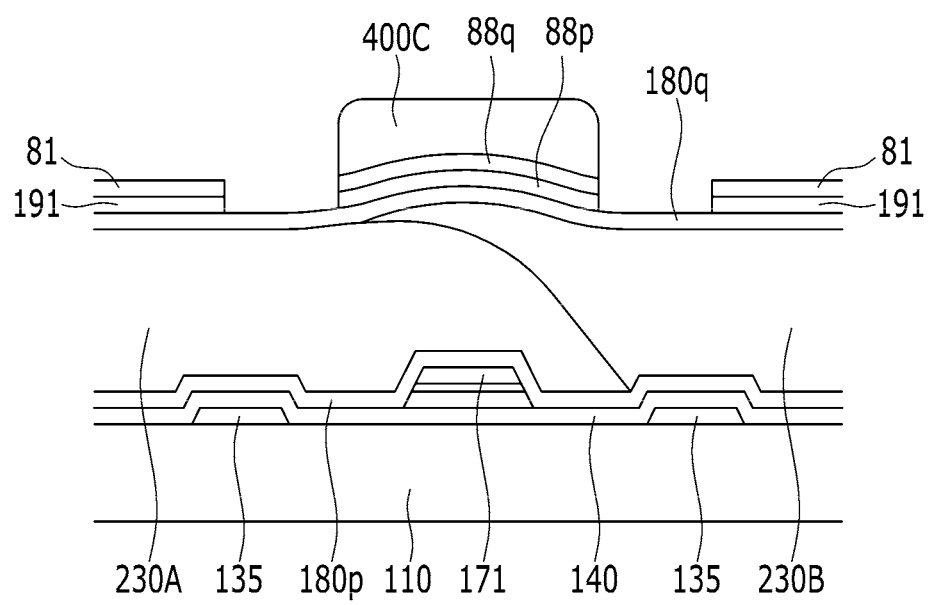

Referring to FIG. 10, ashing is performed on the first photosensitive film pattern 400A and the second photosensitive film pattern 400B to reduce their heights and remove the second photosensitive film pattern 400B, and a third photosensitive film pattern 400C is formed to have a height that is lower than that of the first photosensitive film pattern 400A.

Figure 11:
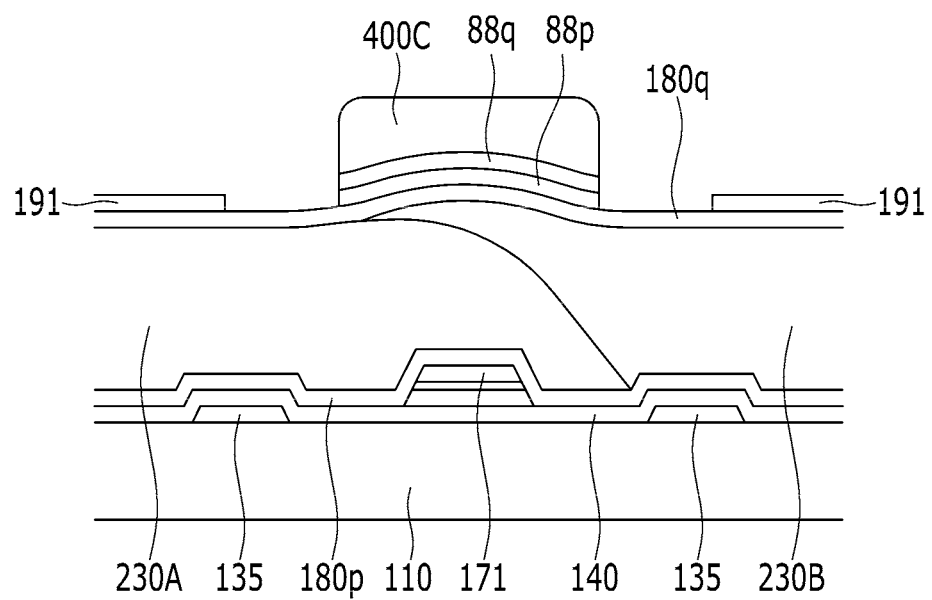

Next as shown in FIG. 11, the opaque metal layer 81 formed on the pixel electrode 191 is etched by using the third photosensitive film pattern 400C as an etching mask to be removed.

Figure 12:
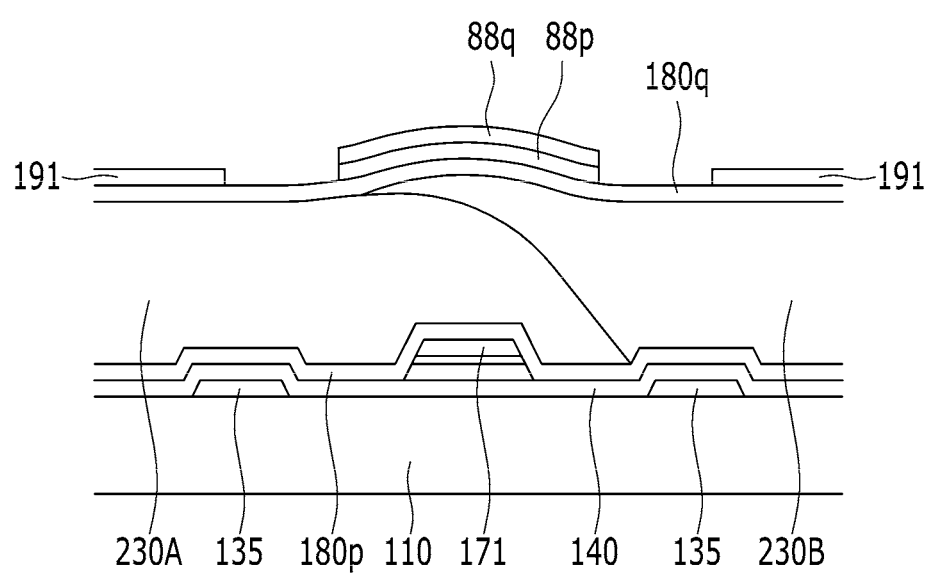

Thereafter, the third photosensitive film pattern 400C is removed to form the pixel electrode 191 and the shielding electrode 88 including the lower layer 88p formed at the same layer as that of the pixel electrode 191 and the upper layer 88q formed of an opaque metal layer, as shown in FIG. 12.

Figure 13:
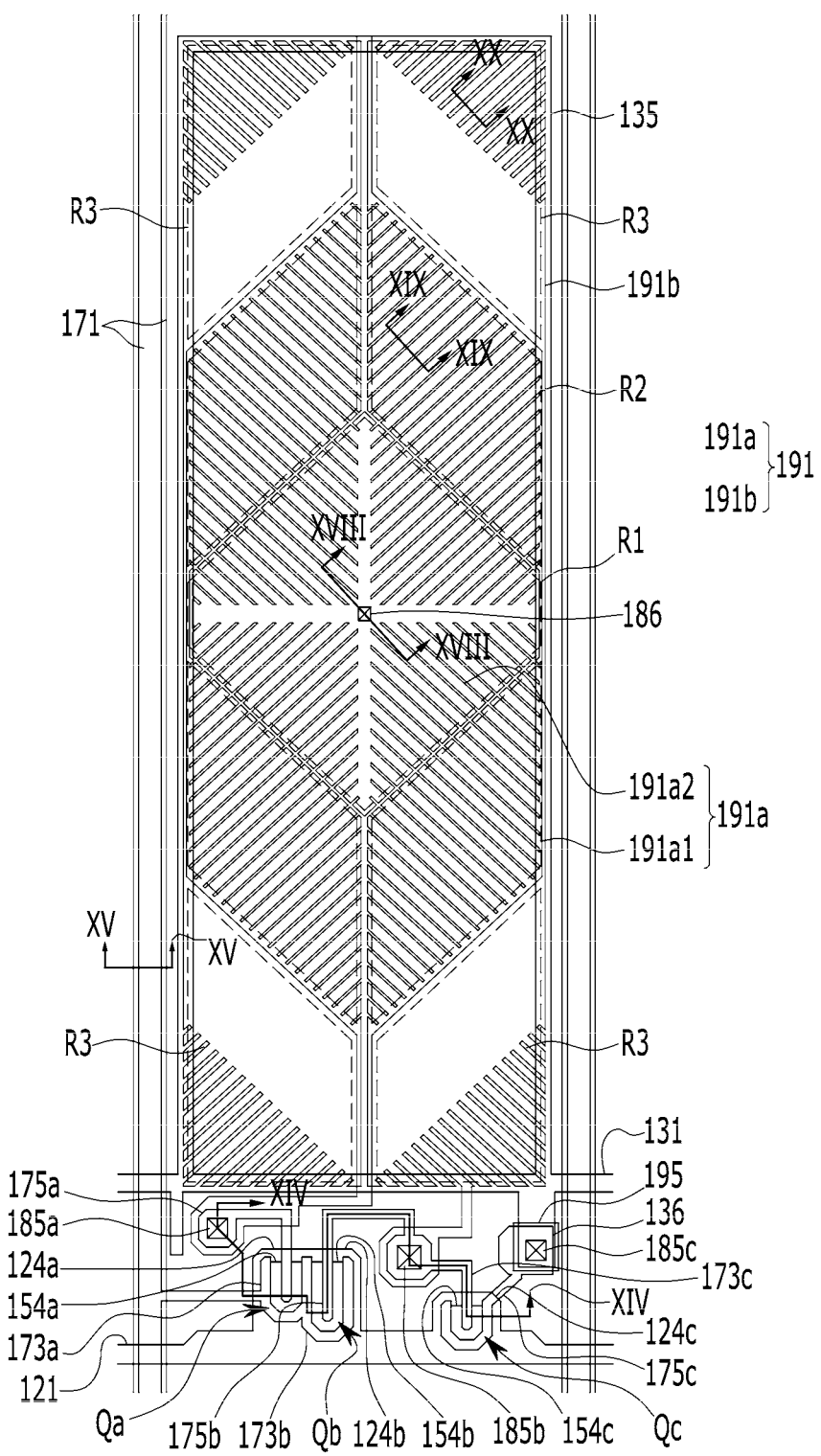
FIG. 13 is a layout view of a liquid crystal display according to an exemplary embodiment.
Figure 14:
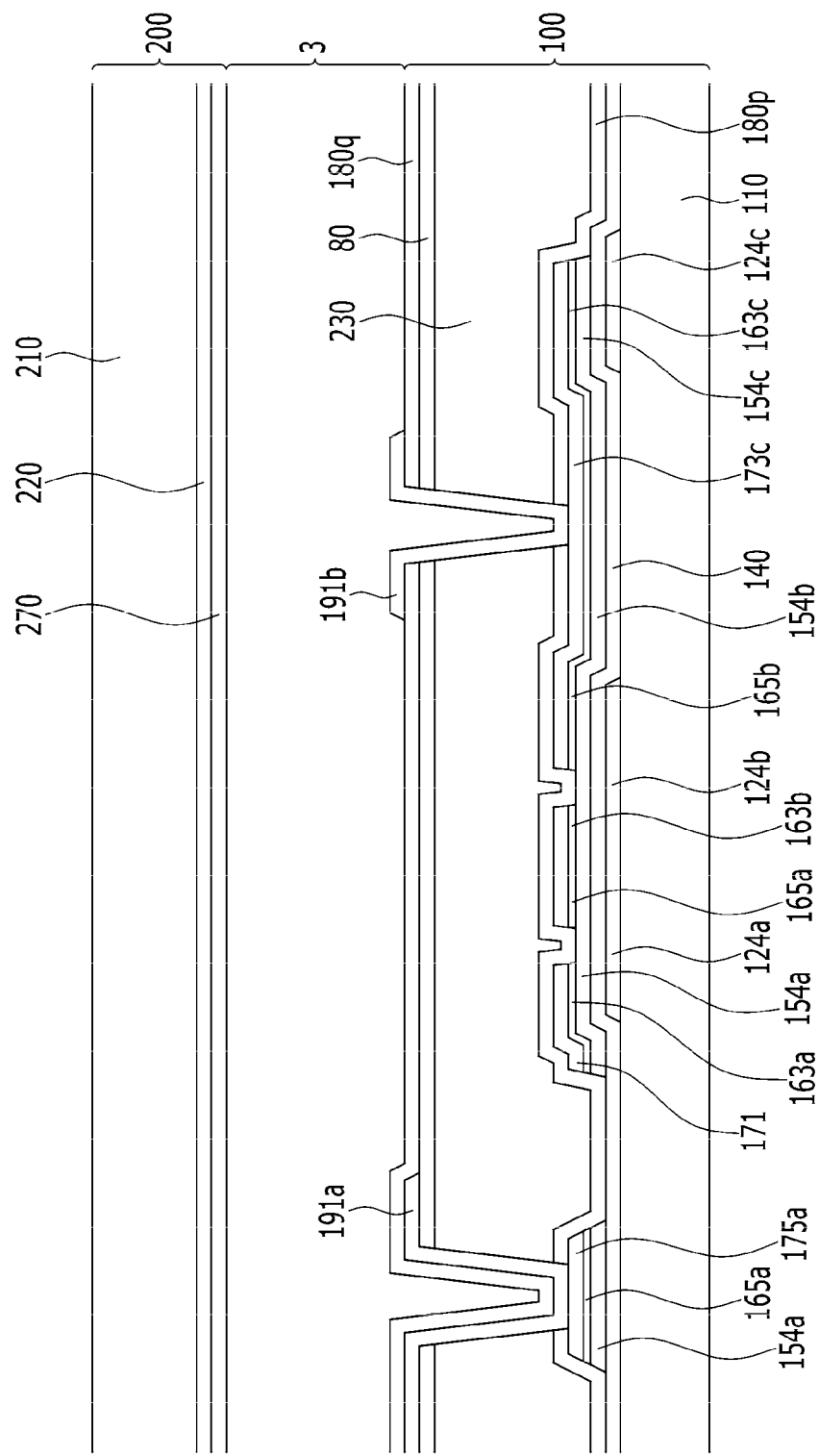
FIG. 14 is a cross-sectional view illustrating the liquid crystal display of FIG. 13 taken along a line XIV-XIV.
Figure 16:
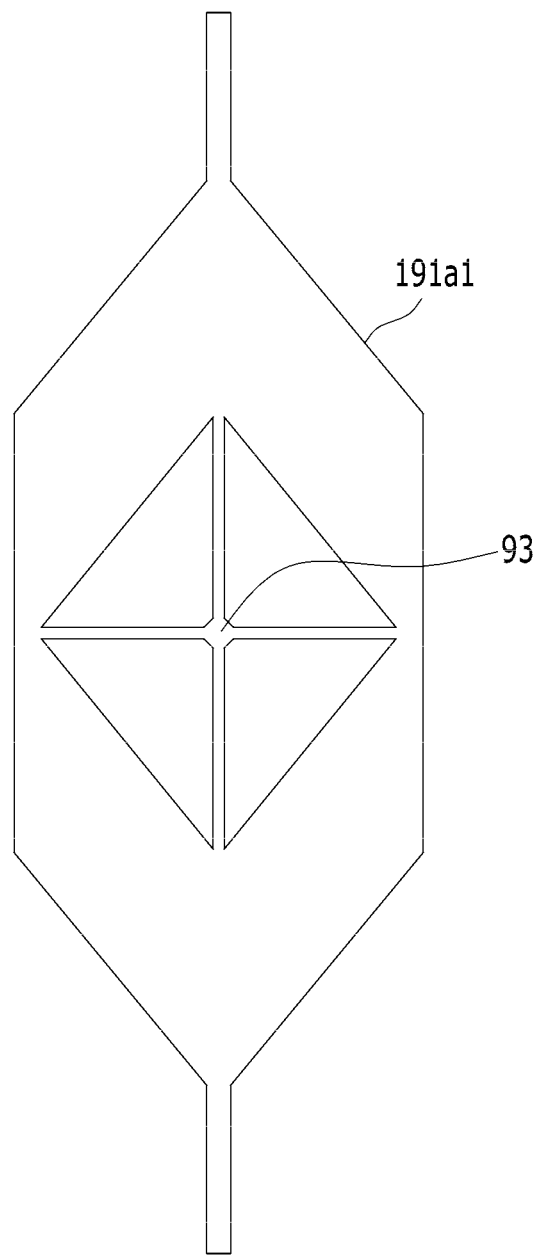
FIG. 16 is a layout view of a first subpixel electrode of the liquid crystal display of FIG. 13.
Figure 17:
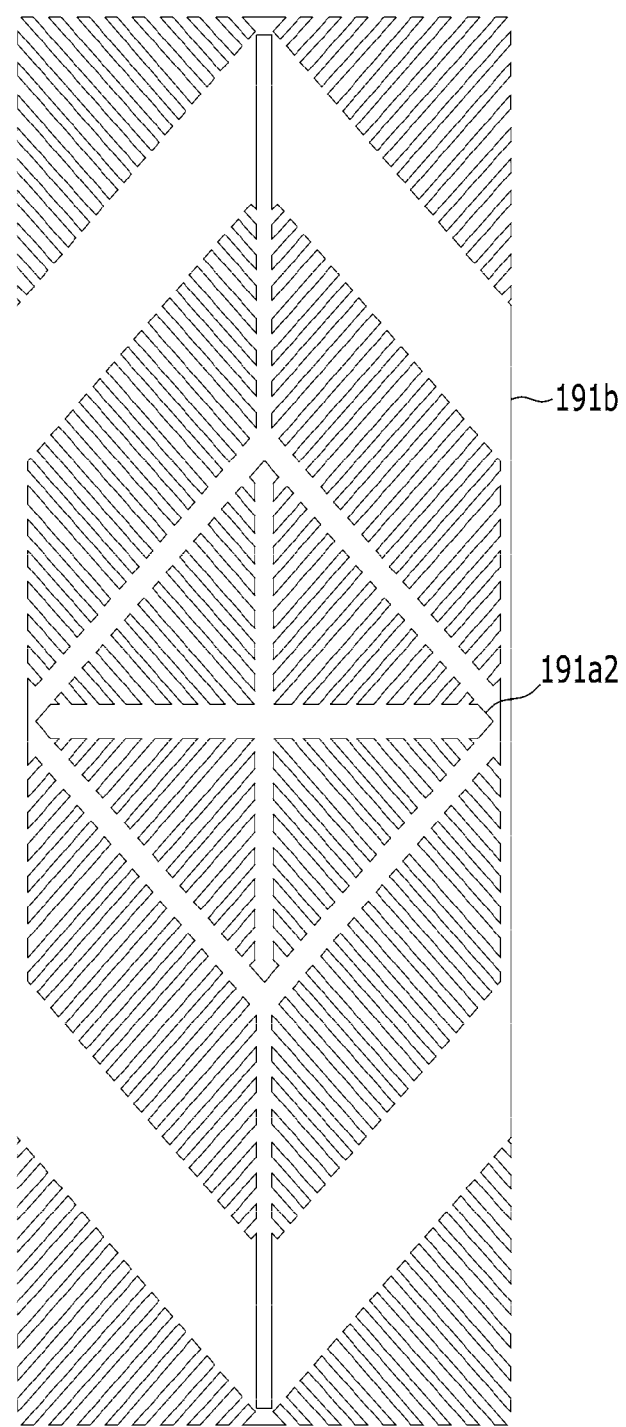
FIG. 17 is a layout view of a portion of the first subpixel electrode and a second subpixel electrode included in the liquid crystal display of FIG. 13.
Figure 18:
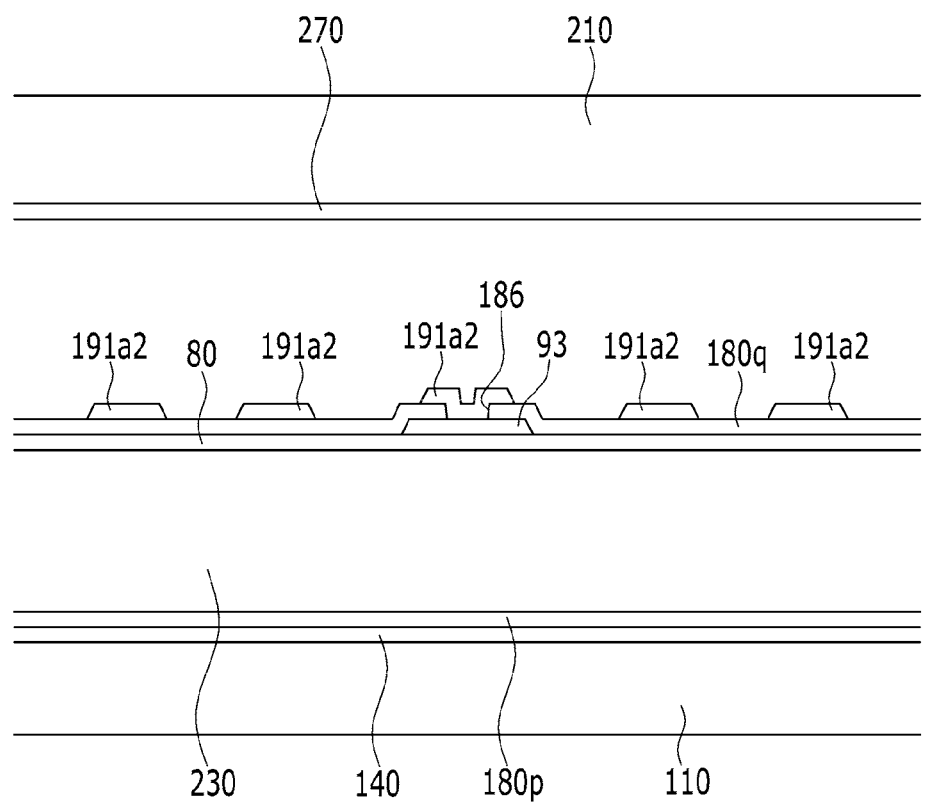
FIG. 18 is a cross-sectional view of the liquid crystal display of FIG. 13 taken along a line XVIII-XVIII.
Figure 19:
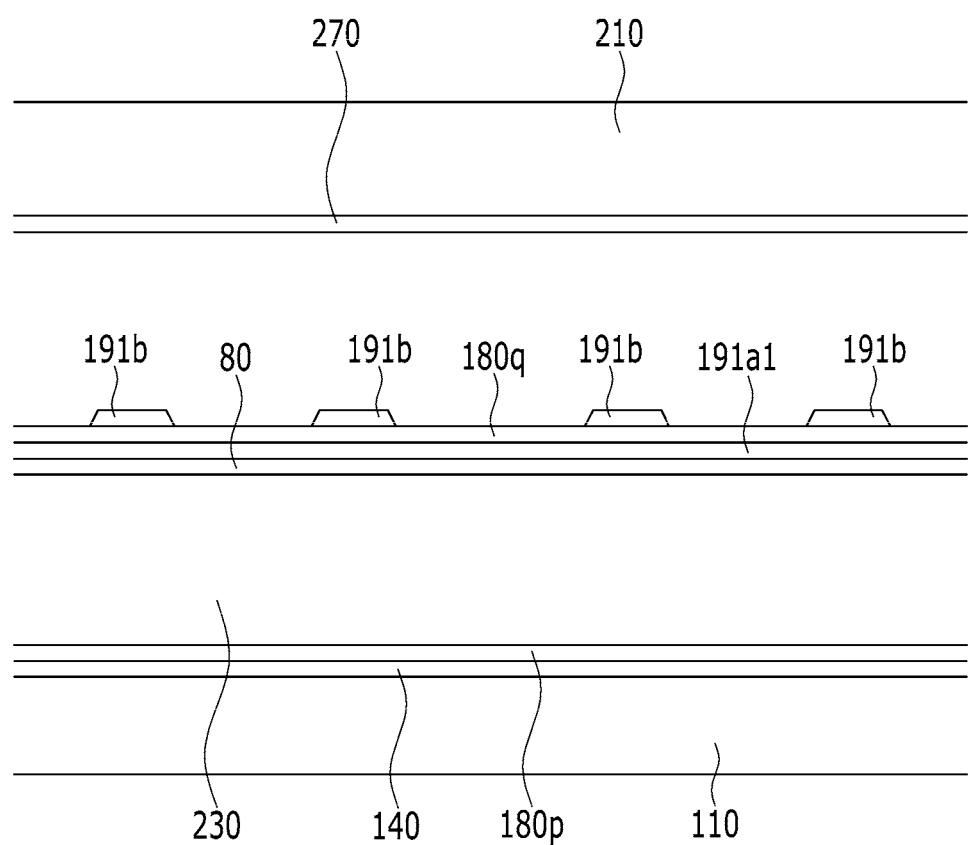
FIG. 19 is a cross-sectional view of the liquid crystal display of FIG. 13 taken along a line XIX-XIX.
Figure 20:
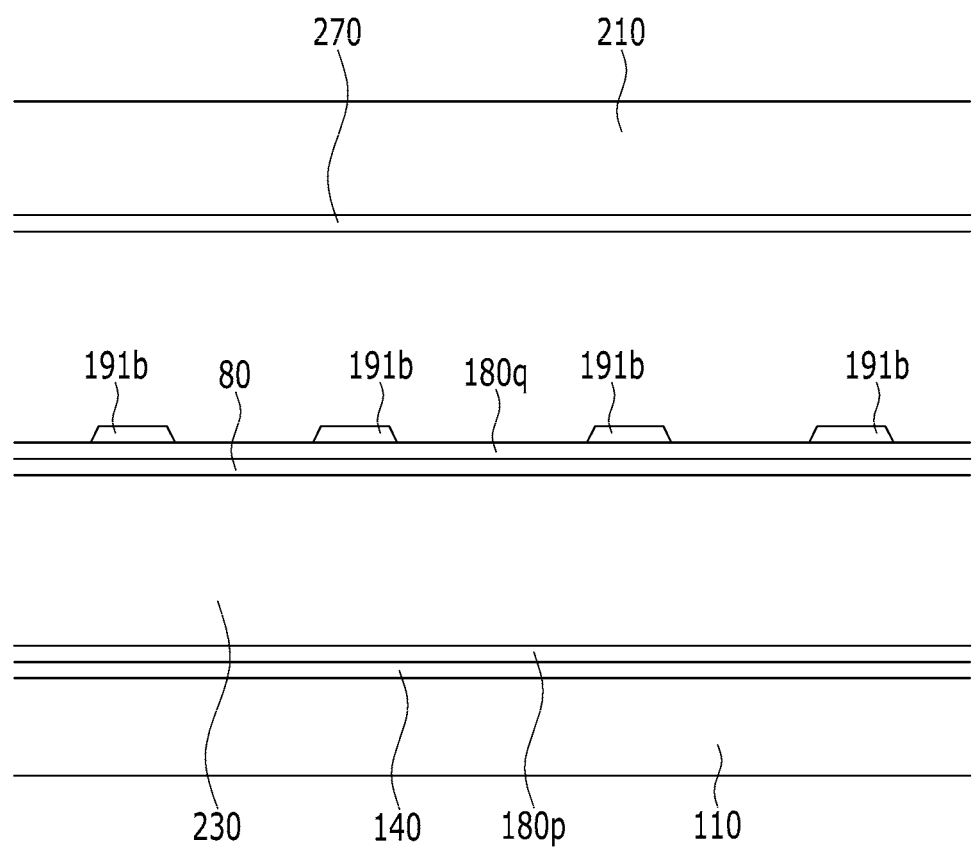
FIG. 20 is a cross-sectional view of the liquid crystal display of FIG. 13 taken along a line XX-XX.

Hereinafter, a liquid crystal display according to an exemplary embodiment will be described with reference to FIG. 13 through FIG. 20. FIG. 13 is a layout view of a liquid crystal display according to an exemplary embodiment, FIG. 14 is a cross-sectional view illustrating the liquid crystal display of FIG. 13 taken along a line XIV-XIV, and FIG. 15 a cross-sectional view illustrating the liquid crystal display of FIG. 13 taken along a line XV-XV. FIG. 16 is a layout view of a first subpixel electrode of the liquid crystal display of FIG. 13, and FIG. 17 is a layout view of a portion of the first subpixel electrode and a second subpixel electrode included in the liquid crystal display of FIG. 13. FIG. 18 is a cross-sectional view of the liquid crystal display of FIG. 13 taken along a line XVIII-XVIII, FIG. 19 is a cross-sectional view of the liquid crystal display of FIG. 13 taken along a line XIX-XIX, and FIG. 20 is a cross-sectional view of the liquid crystal display of FIG. 13 taken along a line XX-XX.

Referring to FIG. 13 and FIG. 14, the liquid crystal display according to the present exemplary embodiment includes a first display panel 100 and a second display panel 200 disposed to facing each other, and a liquid crystal layer 3 provided between the display panels 100 and 200.

A gate line 121, a reference voltage line 131, and a storage electrode 135 are formed on a first substrate 110 made of transparent material such as glass or plastic. The gate line 121 mainly extends in a horizontal direction to transmit a gate signal.

The gate line 121 includes a wide end (not illustrated) for connection with a first gate electrode 124a, a second gate electrode 124b, a third gate electrode 124c, and another layer or an external driving circuit.

The reference voltage line 131 may be extended in parallel with the gate line 121, and it includes an expansion 136 which is connected to a third drain electrode 175c to be described later.

The reference voltage line 131 includes the storage electrode 135 surrounding a pixel area.

A gate insulating layer 140 is formed on the gate line 121, the reference voltage line 131, and the storage electrode 135.

A first semiconductor 154a, a second semiconductor 154b, and a third semiconductor 154c made of amorphous silicon or crystalline silicon are formed on the gate insulating layer 140.

A plurality of ohmic contacts 163a, 163b, 163c, 165a, 165b, and 165c are formed on the first semiconductor 154a, the second semiconductor 154b, and the third semiconductor 154c. When the semiconductors 154a, 154b, and 154c are oxide semiconductors, the ohmic contacts may be omitted.

Data conductors 171, 173a, 173b, 173c, 175a, 175b, and 175c which include a data line 171 which includes a first source electrode 173a and a second source electrode 173b, a first drain electrode 175a, a second drain electrode 175b, a third source electrode 173c, and the third drain electrode 175c are formed on the ohmic contacts 163a, 163b, 163c, 165a, and 165b, and the gate insulating layer 140.

The second drain electrode 175b is connected to the third source electrode 173c.

The first gate electrode 124a, the first source electrode 173a, and the first drain electrode 175a form a first thin film transistor Qa together with the first semiconductor 154a, and a channel of the first thin film transistor is formed in the first semiconductor 154a between the first source electrode 173a and the first drain electrode 175a. Similarly, the second gate electrode 124b, the second source electrode 173b, and the second drain electrode 175b form a second thin film transistor Qb together with the second semiconductor 154b, and a channel of the second thin film transistor is formed in the semiconductor portion 154b between the second source electrode 173b and the second drain electrode 175b, while the third gate electrode 124c, the third source electrode 173c, and the third drain electrode 175c form a third thin film transistor Qc together with the third semiconductor island 154c, and a channel of the third thin film transistor is formed in the semiconductor portion 154c between the third source electrode 173c and the third drain electrode 175c.

A first passivation layer 180p is formed on the data conductors 171, 173a, 173b, 173c, 175a, 175b, and 175c and exposed portions of the semiconductors 154a, 154b, and 154c. In this case, the first passivation layer 180p may be made of an insulating material, such as a silicon nitride and a silicon oxide.

A color filter 230 is disposed on the first passivation layer 180p.

A light blocking member 220 may be disposed on an area in which the color filter 230 is not disposed. The light blocking member may also be a black matrix and prevents light leakage.

A capping layer 80 is disposed on the color filter 230. The capping layer 80 prevents the color filter 230 from lifting and suppresses contamination of the liquid crystal layer 3 by an organic material, such as a solvent flowing from the color filter, so as to prevent defects, such as an afterimage, from being generated when a screen is driven.

A first subregion 191a1 of a first subpixel electrode 191a is formed on the capping layer 80.

Referring to FIG. 16, the first subregion 191a1 of the first subpixel electrode 191a has a planar shape including a cross-shaped connector positioned in the center of the pixel area and four parallelograms positioned to surround the cross-shaped connector. A first extension 93 is positioned at the center of the cross-shaped connector. Further, the first subregion 191a1 of the first subpixel electrode 191a pixel area has protrusions that vertically extend along a horizontal central portion of the pixel area. As such, the first subregion 191a1 of the first subpixel electrode 191a is positioned at a portion of the pixel area.

A second passivation layer 180q is formed on the capping layer 80 and the first subregion 191a1 of the first subpixel electrode 191a.

A second subregion 191a2 of the first subpixel electrode 191a and the second subpixel electrode 191b is formed on the second passivation layer 180q.

Referring to FIG. 17, the second subregion 191a2 of the first subpixel electrode 191a is positioned at a center of the pixel and has a substantially rhombus shape. The second subregion 191a2 of the first subpixel electrode 191a includes a cross-shaped stem, including a horizontal portion and a vertical portion, and a plurality of first branch electrodes extending from the cross-shaped stem. The first branch electrodes are disposed to extend in four directions.

The second subpixel electrode 191b includes a portion positioned to overlap the first subregion 191a1 of the first subpixel electrode 191a and a fourth subregion other than the third subregion. The third subregion of the second subpixel electrode 191b and the first subregion 191a1 of the first subpixel electrode 191a overlap each other while interposing the insulating layer, specifically, the second passivation layer 180q therebetween, and the second subregion 191a2 of the first subpixel electrode 191a includes a plurality of second branch electrodes that extend in the same direction as the first branch electrodes.

The fourth subregion of the second subpixel electrode 191b includes a plate portion having a trapezoid plane shape, and a plurality of third branch electrodes positioned outside the plate portion to extend in a direction parallel to the second branch electrodes. The plate shape is a plate shape as it is without splitting.

A first contact hole 185a is formed in the first passivation layer 180p and the capping layer 80 to partially expose the first drain electrode 175a, and a second contact hole 185b is formed in the first passivation layer 180p, the capping layer 80, and the second passivation layer 180q to partially expose the second drain electrode 175b. Further, a fourth contact hole 186 is formed in the second passivation layer 180q to expose a central portion of the first subregion 191a1 of the first subpixel electrode 191a.

The first subregion 191a1 of the first subpixel electrode 191a is physically and electrically connected to the first drain electrode 175a through the first contact hole 185a, and the second subpixel electrode 191b is physically and electrically connected to the second drain electrode 175b through the second contact hole 185b. In addition, the second subregion 191a2 of the first subpixel electrode 191a is connected to the first expansion 193 of the first subregion 191a1 of the first subpixel electrode 191a through the fourth contact hole 186 formed in the second passivation layer 180b.

The first subpixel electrode 191a and the second subpixel electrode 191b respectively receive data voltages from the first drain electrode 175a and the second drain electrode 175b through the first contact hole 185a and the second contact hole 185b.

Figure 15:
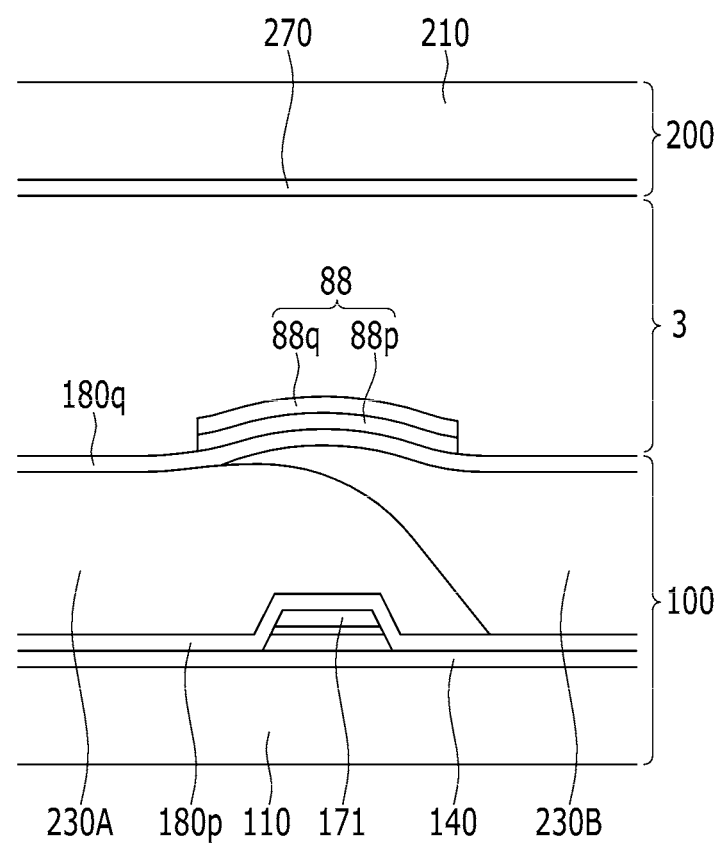
FIG. 15 a cross-sectional view illustrating the liquid crystal display of FIG. 13 taken along a line XV-XV.

Referring to FIG. 15, the shielding electrode 88 is formed on the second passivation layer 180q. The shielding electrode 88 includes the lower layer 88p formed of the same layer as that of the second subpixel electrode 191b of the pixel electrode 191 and an upper layer 88q formed on the lower layer 88p by using an opaque metal layer.

The shielding electrode 88 is formed to overlap the data line 171, and a width of the shielding electrode 88 is wider than that of the data line.

The shielding electrode 88 receives a common voltage of which a magnitude is the same as that of the common electrode 270 which will be described later.

Next, the upper panel 200 will be described.

A light blocking member 220 and a common electrode 270 are formed on a second substrate 210 made of transparent material, such as glass or plastic.

However, the light blocking member 220 may be disposed on the first display panel 100 in the case of a liquid crystal display according to another exemplary embodiment, and a color filter may be disposed on the second display panel 200 in the case of a liquid crystal display according to yet another exemplary embodiment.

Alignment layers (not shown) are formed on inner surfaces of the display panels 100 and 200, and they may be vertical alignment layers.

Polarizers (not shown) are formed on the outer surface of the display panels 100 and 200. Herein, the polarization axes of the two polarizers are crossed, and one polarization axis thereof may be parallel to the gate lines 121. However, the polarizer may be exclusively disposed on one outer surface of either one of the two display panels 100 and 200.

The liquid crystal layer 3 has negative dielectric anisotropy, and liquid crystal molecules 31 of the liquid crystal layer 3 are aligned such that their long axes are perpendicular to the surfaces of the two display panel 100 and 200 while no electric field is present. As a result, incident light is blocked and does not pass through the crossed polarizers in the state of having no electric field.

At least one of the liquid crystal layer 3 and the alignment layer may include a photo-reactive material, specifically, a reactive mesogen.

Hereinafter, a driving method of a liquid crystal display according to an exemplary embodiment will be briefly described.

When a gate-on signal is applied to a gate line 121, the gate-on signal is applied to a first gate electrode 124a, a second gate electrode 124b, and a third gate electrode 124c, thereby turning on a first switching element Qa, a second switching element Qb, and a third switching element Qc. Accordingly, a data voltage applied to a data line 171 is applied to both a first subpixel electrode 191a and a second subpixel electrode 191b through the turned-on first and second switching elements Qa and Qb. In this case, the same voltage is applied to the first subpixel electrode 191a and the second subpixel electrode 191b. However, the voltage applied to the second subpixel electrode 191b is divided by the third switching element Qc that is connected in series to the second switching element Qb. Thus, the voltage applied to the second subpixel electrode 191b is smaller than the voltage applied to the first subpixel electrode 191a.

Again referring to FIG. 13, one pixel area of the liquid crystal display according to the present exemplary embodiment includes a first region R1 where the second subregion 191a2 of the first subpixel electrode 191a is positioned, a second region R2 where a portion of the first subregion 191a1 of the first subpixel electrode 191a and a portion of the second subpixel electrode 191b are positioned to overlap each other, and a third region R3 where a portion of the second subpixel electrode 191b is positioned.

The first region R1, the second region R2, and the third region R3 respectively include four subregions.

Now, the first region R1, the second region R2, and the third region R3 included in one pixel area of the liquid crystal display according to the present exemplary embodiment will be described with reference to FIG. 18 to FIG. 20.

Referring to FIGS. 13 and 18, the first region R1 of one pixel area of the liquid crystal display according to the present exemplary embodiment is positioned in the first display panel 100, and an electric field is generated by the second subregion 191a2 of the first subpixel electrode 191a connected to the extension 93 of the first subregion 191a1 of the first subpixel electrode 191a and the common electrode 270 disposed in the second display panel 200. In this case, the second subregion 191a2 of the first subpixel electrode 191a includes the cross-shaped stem and the first branch electrodes extending in four different directions. The first branch electrode may be inclined at an angle of about 40° to about 45° with respect to the gate line 121. The liquid crystal molecules 310 of the liquid crystal layer positioned in the first region R1 are inclined in four different directions by the action of a fringe field generated by edges of the first branch electrodes. Specifically, since a horizontal component of the fringe field caused by the first branch electrodes is substantially parallel with sides of the first branch electrodes, the liquid crystal molecules are inclined toward a direction parallel to a longitudinal direction of the first branch electrodes.

Referring to FIGS. 13 and 19, the third subregion of the second subpixel electrode 191b disposed in the first display panel 100 is positioned to overlap the first subregion 191a1 of the first subpixel electrode 191a at the second region R2 of one pixel area of the liquid crystal display according to the present exemplary embodiment. The liquid crystal molecules of the liquid crystal layer 3 are arranged by an electric field generated between the common electrode 270 and the first subregion 191a1 of the first subpixel electrode 191a disposed between the second branch electrodes of the third subregion of the second subpixel electrode 191b and an electric field generated between the third subregion of the second subpixel electrode 191b and the first subregion 191a1 of the first subpixel electrode 191a in addition to an electric field generated between the third subregion of the second subpixel electrode 191b and the common electrode 270 of the second display panel 200.

Next referring to FIGS. 13 and 20, an electric field is generated by the fourth subregion of the second subpixel electrode 191b disposed in the first display panel 100 and the common electrode 270 of the second display panel 200 at the third region R3 of one pixel area of the liquid crystal display according to the present exemplary embodiment In this case, a portion of the fourth subregion of the second subpixel electrode 191b has a plate shape and the remaining portion thereof includes the third branch electrodes. As such, it is possible to improve transmittance of the liquid crystal display by including the plate-shaped second subpixel electrode 191b. The liquid crystal molecules corresponding to the plate-shaped second subpixel electrode 191b are inclined in a longitudinal direction of the second branch electrodes and the third branch electrodes by the action of the liquid crystal molecules, which are inclined in different directions by the fringe field generated by the second branch electrodes and the third branch electrodes.

As described above, a magnitude of the second voltage applied to the second subpixel electrode 191b is smaller than that of the first voltage applied to the first subpixel electrode 191a.

Accordingly, the strongest electric field is applied to the liquid crystal layer disposed at the first region R1, and the smallest electric field is applied to the liquid crystal layer disposed at the third region R3. Since the second region R2 is affected by the electric field of the first subpixel electrode 191a disposed below the second subpixel electrode 191b, the intensity of the electric field applied to the liquid crystal layer disposed in the second region R2 is lower than the intensity of the electric field applied to the liquid crystal layer disposed in the first region R1 and higher than the intensity of the electric field applied to the liquid crystal layer disposed in the third region R3.

As such, in the liquid crystal display according to the exemplary embodiment, one pixel area is divided into the first region where the first subpixel electrode to which a relatively high first voltage is applied is disposed, the second region where a portion of the first subpixel electrode and a portion of the second subpixel electrode to which a relatively low second voltage is applied are disposed to overlap each other with the insulating layer therebetween, and the third region where the second subpixel electrode to which the relatively low second voltage is applied is disposed. Accordingly, the intensities of the electric fields, which are respectively applied to the liquid crystal molecules corresponding to the first region, the second region, and the third region are different, so that the liquid crystal molecules are inclined at different angles, thereby accomplishing different levels of luminance of each region. For example, when one pixel area is divided into three regions having different luminance, it is possible to prevent transmittance from being sharply changed according to gray variation even in a low gray and a high gray of a side surface to thereby accomplish exact gray display in the low gray and the high gray while allowing side visibility to approximate to front visibility.

The liquid crystal display according to the exemplary embodiment may be curved.

In accordance with the liquid crystal display according to the present exemplary embodiment, since the common voltage is applied to the shielding electrode 88 which has a width that is wider than that of the data line 171 and is disposed to overlap the data line 171, no electric field is applied to the liquid crystal molecules positioned at the position to overlap the data line 171. Accordingly, the liquid crystal molecules positioned at the position to overlap the data line 171 maintain the initial alignment state. Specifically, the liquid crystal molecules positioned at the position to overlap the data line 171 maintain the state of being arranged to be substantially perpendicular to the surface of the first substrate 110.

Further, the shielding electrode 88 includes a lower layer 88*p* formed of the same layer as that of the pixel electrode 191 and an upper layer 88*q* formed on the lower layer 88*p* by using an opaque metal layer. Accordingly, light leakage that may be generated at the position to overlap the data line 171 can be prevented by the action of the upper layer 88*q* of the shielding electrode 88.

As such, in accordance with the liquid crystal display according to an exemplary embodiment, it is possible to allow the liquid crystal molecules positioned in the position to overlap the data line 171 to maintain the initial alignment state by forming the shielding electrode 88 at the position to overlap the data line 171, to include the lower layer 88*p* formed of the same layer as that of the pixel electrode 191 and the upper layer 88*q* formed on the lower layer 88*p* by using the opaque metal layer, and to prevent the light leakage which may be generated at the position to overlap the data line 171 by the action of the upper layer 88*q* of the shielding electrode 88 formed of the opaque metal layer. Accordingly, in accordance with the liquid crystal display according to an exemplary embodiment, it is possible to prevent light leakage which may be generated around the data line 171 due to, e.g., misalignment between the two substrates 110 and 210 due to be curved, or steps of layers that are overlapped with the data line 171.

According to an exemplary embodiment, it is possible to provide a liquid crystal display capable of preventing display quality deterioration such as light leakage from being generated at adjacent portions of data lines disposed between two adjacent pixels even when two display panels in which a pixel electrode and a common electrode are formed are misaligned from each other.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
   a first substrate;
   a gate line disposed on the first substrate;
   a gate insulating layer disposed on the gate line;
   a data line disposed on the gate insulating layer;
   a first passivation layer disposed on the data line;
   a color filter disposed on the first passivation layer;
   a second passivation layer disposed on the color filter;
   a pixel electrode and a shielding electrode disposed on the passivation layer;
   a second substrate facing the first substrate; and
   a common electrode disposed on the second substrate,
   wherein the shielding electrode comprises:
      a lower layer formed at a same layer as that of the pixel electrode; and
      an upper layer formed on the lower layer by using an opaque metal layer;
   the shielding electrode is insulated from the data line;
   the shielding electrode is disposed to overlap the data line, and a width of the shielding electrode is greater than that of the data line;
   the shielding electrode receives a common voltage that is applied to the common electrode;
   the pixel electrode comprises a first subpixel electrode and a second subpixel electrode that are insulated from each other and respectively receive a first voltage and a second voltage; and
   a difference between the first voltage and the common voltage is greater than a difference between the second voltage and the common voltage.

2. The liquid crystal display of claim 1, wherein the color filter comprises a first color filter and a second color filter that display different colors, and the first color filter and the second color filter overlap each other at a position overlapping the data line.

3. The liquid crystal display of claim 1, wherein:
   a first portion of the first subpixel electrode and a second portion of the second subpixel electrode are disposed to overlap each other; and
   an insulating layer is disposed between the first subpixel electrode and the second subpixel electrode.

4. The liquid crystal display of claim 3, wherein at least a portion of the first subpixel electrode is disposed below the insulating layer, and
   the second subpixel electrode is disposed on the insulating layer.

5. The liquid crystal display of claim 4, wherein:
   the first portion of the first subpixel electrode comprises a first subregion disposed below the insulating layer and a second subregion disposed on the insulating layer; and
   the first subregion and the second subregion are connected to each other through a contact hole formed at the insulating layer.

6. The liquid crystal display of claim 1, wherein the pixel electrode comprises a plurality of branch electrodes that extend in a plurality of directions.

* * * * *